(No Model.)
J. A. NISBET.
JAWS FOR STEEL TRAPS.
No. 588,169. Patented Aug. 17, 1897.
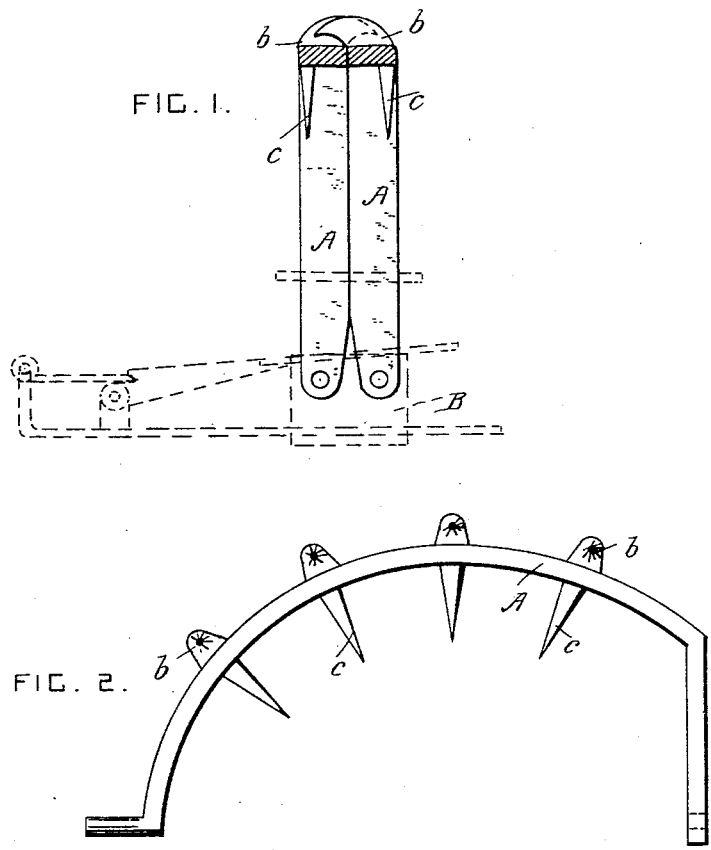
WITNESSES
George H. Bliss Jr
Walter Allen
INVENTOR
James A. Nisbet.
by Herbert W. T. Jenner.
Attorney

UNITED STATES PATENT OFFICE.

JAMES A. NISBET, OF HAMBURG, MICHIGAN.

JAW FOR STEEL TRAPS.

SPECIFICATION forming part of Letters Patent No. 588,169, dated August 17, 1897.

Application filed January 18, 1897. Serial No. 619,694. (No model.)

*To all whom it may concern:*

Be it known that I, JAMES A. NISBET, residing at Hamburg, in the county of Livingston and State of Michigan, have invented certain new and useful Improvements in Jaws for Traps, of which the following is a specification.

This invention relates to the jaws of spring-traps of approved construction; and it consists in the novel construction of the same, as hereinafter fully described and claimed, whereby the jaws are better enabled to retain anything caught between them.

In the drawings, Figure 1 is a cross-section through a pair of jaws constructed according to this invention. Fig. 2 is a side view of one of the said jaws.

A are the jaws, which are pivoted in a frame B, which is shown in dotted lines and is constructed in any approved manner. The jaws are of substantially the same shape as those commonly used in spring-traps for vermin and which spring together when a retaining-catch is released.

Each jaw is provided on its upper side with a series of hooked teeth $b$, which overlap the adjacent jaw when the jaws come together. Each jaw is also provided on its under side with a series of straight and sharp prongs $c$. These prongs are arranged substantially at right angles to the portions of the jaws from which they project.

The hooked teeth are very effective in holding any living creature which may be seized between the jaws of the trap, and the pointed prongs prevent animals from gnawing through the portions of their limbs below the jaws.

The teeth and the prongs are preferably formed integral with the jaws and are of any hard metal.

What I claim is—

1. A pair of jaws for a trap, each jaw being provided with a series of hooked teeth on its upper side and a series of straight and sharp prongs on its under side, substantially as described and shown.

2. A pair of jaws for a trap, each jaw being provided with a series of hooked teeth on its upper side and a series of straight and sharp prongs on its under side, the said teeth and prongs being formed integral with the jaws, substantially as described and shown.

JAS. A. NISBET.

Witnesses:
 DAN THOMAS,
 J. L. KISBY.